United States Patent Office 3,122,556
Patented Feb. 25, 1964

3,122,556
N-(ω-PHENOXYALKYL) DERIVATIVES OF 4-ALKOXY-4-PHENYLPIPERIDINES
Paul A. J. Janssen, Vosselaar, near Turnhout, Belgium, assignor to Research Laboratorium Dr. C. Janssen, N.V., Beerse, Belgium, a company of Belgium
No Drawing. Filed Mar. 22, 1961, Ser. No. 97,424
7 Claims. (Cl. 260—294.7)

The present invention relates to a series of N-phenoxyalkyl derivatives of 4-alkoxy-4-phenylpiperidines. More particularly, the invention relates to compounds having the following general formula

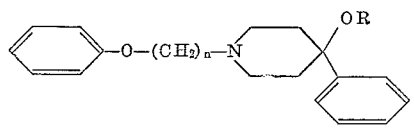

wherein $n$ is an integer greater than 1 and less than 5 and R is a lower alkyl group consisting of less than four carbon atoms. Thus, R can represent methyl, ethyl, or propyl.

The compounds of this invention are active inhibitors of pentylenetetrazole-induced convulsions. This activity is unexpected because the corresponding alcohols, which are N-phenoxyalkyl-4-phenylpiperidin-4-ols, do not possess this anti-convulsant activity.

The organic bases of this invention form non-toxic, acid-addition salts with a variety of organic and inorganic acids. Such salts are formed with such acids as sulfuric, phosphoric, hydrochloric, hydrobromic, hydriodic, sulfamic, citric, lactic, maleic, malic, succinic, tartaric, cinnamic, acetic, benzoic, gluconic, ascorbic and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethylsulfate, diethylsulfate, methyl benzenesulfonate, ethyl toluenesulfonate, ethylene chlorohydrin, propylene chlorohydrin, allyl bromide, methallyl bromide and crotyl bromide.

These compounds can be prepared by the condensation of the appropriate phenoxyalkyl halide with a 4-alkoxy-4-phenylpiperidine. The reaction is carried out in a suitable inert solvent such as 4-methyl-2-pentanone or toluene. The reaction can be accelerated by heating the mixture at atmospheric pressure or in a sealed tube.

The 4-alkoxy-4-phenylpiperidines described above as intermediates are prepared in the following manner. 4-phenylpiperidin-4-ol is heated with p-toluenesulfonyl chloride to give 1-(p-tosyl)-4-phenylpiperidin-4-ol which is heated with sodamide in toluene to give the alkoxide. Further heating of the alkoxide with an appropriate alkyl halide gives the corresponding 1-(p-tosyl)-4-alkoxy-4-phenylpiperidine having the formula

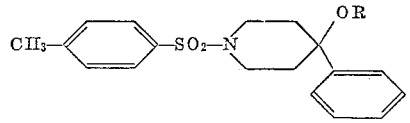

This compound is heated with sodium in butanol under a nitrogen atmosphere to produce the desired 4-alkoxy-4-phenylpiperidine.

The compounds which constitute this invention and their preparation will appear more fully from a consideration of the following examples which are given for the purpose of illustration only and are not to be construed as limiting the invention in spirit or in scope.

In these examples, quantities are indicated as parts by weight, temperatures in degrees centigrade (° C.) and pressures in millimeters of mercury (mm.).

Example 1

To a mixture of 35 parts of 4-phenylpiperidin-4-ol and 63.5 parts of sodium carbonate in 480 parts of 4-methyl-2-pentanone is added portionwise a solution of 52 parts of p-toluenesulfonyl chloride in 120 parts of 4-methyl-2-pentanone with stirring and gentle heating. After the addition is complete, refluxing and stirring are continued for about 16 hours. The reaction mixture is cooled and 200 parts of water is added. The water layer is separated and extracted with 100 parts of chloroform. The organic layers are combined, dried over potassium carbonate and concentrated to a volume of about 150 parts. The solid which precipitates is filtered, washed and dried to yield 1-(4-tosyl)-4-phenylpiperidin-4-ol melting at about 183–184° C.

Example 2

To a suspension of 9.8 parts of sodamide in 280 parts of toluene is added 69 parts of 1-(4-tosyl)-4-phenylpiperidin-4-ol. The mixture is stirred and refluxed until evolution of ammonia ceases. After cooling 45 parts of methyl iodide is added and the mixture is stirred and refluxed for 5 hours before it is cooled and 150 parts of water is added. A small amount of insoluble material is removed by filtration. The organic layer is separated, dried over magnesium sulfate, filtered and cooled to 0° C. to give 1-(4-tosyl)-4-methoxy-4-phenylpiperidine melting at about 129–130.2° C.

Example 3

To a suspension of 8.3 parts of sodamide in 256 parts of toluene is added 58 parts of 1-(4-tosyl)-4-phenylpiperidin-4-ol. The mixture is stirred and refluxed for 1 hour until no more ammonia gas is evolved. After cooling to room temperature, 52 parts of ethyl iodide is added and the mixture is stirred and refluxed for 16 hours. The reaction mixture is again cooled and 150 parts of water is added. The precipitate is filtered and the toluene layer is separated from the filtrate. The organic layer is dried over magnesium sulfate, filtered and evaporated. The residue is recrystallized from diisopropyl ether to give 1-(4-tosyl)-4-ethoxy-4-phenylpiperidine melting at about 124.4–125.2° C.

Example 4

Under a nitrogen atmosphere, 58 parts of 1-(4-tosyl)-4-phenylpiperidin-4-ol is added to a suspension of 8.3 parts of sodamide in 256 parts of toluene. The mixture is stirred and refluxed for 1 hour until ammonia evolution ceases. After cooling the reaction mixture to room temperature, 48.8 parts of 1-bromopropane is added and the mixture is refluxed and stirred for about 21 hours. The reaction mixture is again cooled before 250 parts of water is added. Filtration removes the unreacted starting material and the organic layer is separated and dried over magnesium sulfate and evaporated. Recrystallization of the residue from diisopropyl ether yields 1-(4-tosyl)-4-propoxy-4-phenylpiperidine melting at about 125.5–127° C.

Example 5

A solution of 46.5 parts of 1-(4-tosyl)-4-methoxy-4-phenylpiperidine in 1080 parts of 1-butanol is heated to reflux under a nitrogen atmosphere. Then 93 parts of sodium is added portionwise over a period of 1 hour. After this addition is complete, the mixture is refluxed for 1.5 hours until all of the sodium is dissolved. It is then cooled to room temperature and decomposed by the dropwise addition of 400 parts of water. The layers are separated and the aqueous layer is extracted with toluene. The organic extract is added to the first butanol solution and the combined solution is washed three times with 100 parts of water. After evaporation of the solvent the oily residue is dissolved in 400 parts of diisopropyl ether and hydrogen chloride gas is introduced into the solution. The precipitated hydrochloride is filtered off, washed with ether and dried to give 4-methoxy-4-phenylpiperidine hydrochloride melting at about 212–215° C.

Substitution of an equivalent quantity of 1-(4-tosyl)-4-ethoxy-4-phenylpiperidine for the 1-(4-tosyl)-4-methoxy-4-phenylpiperidine in the above example yields 4-ethoxy-4-phenylpiperidine hydrochloride melting at about 170–171° C.

If an equivalent quantity of 1-(4-tosyl)-4-propoxy-4-phenylpiperidine is substituted for the 1-(4-tosyl)-4-methoxy-4-phenylpiperidine of the above example there is obtained 4-propoxy-4-phenylpiperidine hydrochloride melting at about 174–175.2° C.

*Example 6*

An aqueous solution of 6.83 parts of 4-methoxy-4-phenylpiperidine hydrochloride is alkalized and extracted with benzene. After evaporation of the solvent, the residue is dissolved in 120 parts of 4-methyl-2-pentanone together with 8.4 parts of 1-bromo-2-phenoxyethane, 9.5 parts of sodium carbonate and 0.1 part of potassium iodide. The mixture is refluxed for 40 hours and filtered hot. The solvent is evaporated from the filtrate and the oily residue is dissolved in 400 parts of anhydrous diisopropyl ether. Introduction of hydrogen chloride gas into the ether solution precipitates the hydrochloride which is filtered off and recrystallized from 2-propanol. This gives 1-(β-phenoxyethyl)-4-methoxy-4-phenylpiperidine hydrochloride melting at about 207.5–208.2° C. The free base of this compound has the formula

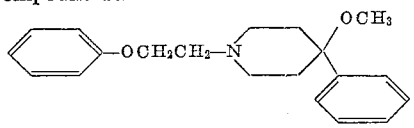

*Example 7*

A mixture of 8.04 parts of 1-bromo-2-phenoxyethane, 7.2 parts of 4-ethoxy-4-phenylpiperidine isolated from its hydrochloride by evaporation of the solvent from the benzene solution of an alkalized aqueous solution of the salt, 10.6 parts of sodium carbonate and 0.1 part of potassium iodide in 280 parts of 4-methyl-2-pentanone is stirred and refluxed for about 100 hours. The reaction mixture is filtered hot and the solvent is evaporated from the filtrate. The oily residue is dissolved in 560 parts of diisopropyl ether and hydrogen chloride gas is introduced into the solution. The precipitated hydrochloride is filtered off and recrystallized from ethyl acetate to give 1-(β-phenoxyethyl)-4-ethoxy-4-phenylpiperidine hydrochloride melting at about 147–148° C.

*Example 8*

A mixture of 8.05 parts of 1-bromo-2-phenoxyethane, 7.66 parts of 4-propoxy-4-phenylpiperidine isolated from its hydrochloride, 10.6 parts of sodium carbonate, and 0.1 part of potassium iodide in 280 parts of 4-methyl-2-pentanone is stirred and refluxed for 50 hours. The hot reaction mixture is filtered and the solvent is evaporated from the filtrate. A solution of the residue in 2-propanol is mixed with a solution of 2.1 parts of oxalic acid dihydrate in 300 parts of 2-propanol. The precipitate which forms is 1-(β-phenoxyethyl)-4-propoxy-4-phenylpiperidine oxalate melting at about 174–176.4° C.

*Example 9*

From an aqueous solution of 11.5 parts of 4-methoxy-4-phenylpiperidine hydrochloride, the free base is liberated by alkalization with sodium hydroxide. The resultant mixture is extracted with toluene, the solvent is evaporated from the toluene solution, and the residue is heated in a sealed tube with 4.3 parts of 1-chloro-3-phenoxypropane and 0.1 part of potassium iodide in 120 parts of anhydrous toluene at 150° C. for 88 hours. The cooled reaction mixture is washed with water and dried over magnesium sulfate. After evaporation of the solvent, the residue is dissolved in 32 parts of petroleum ether and 50 parts of dilute hydrochloric acid (1:1 by volume) is added. The precipitate which forms is filtered off and recrystallized from water to give 1-(γ-phenoxypropyl)-4-methoxy-4-phenylpiperidine hydrochloride melting at about 219–220° C. The free base of this product has the formula

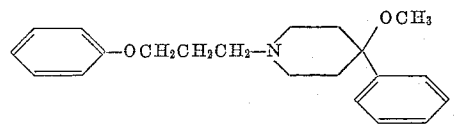

*Example 10*

A mixture of 3.3 parts of 1-chloro-3-phenoxypropane, 3.6 parts of 4-ethoxy-4-phenylpiperidine isolated from its hydrochloride, 5.3 parts of sodium carbonate and 0.1 part of potassium iodide in 280 parts of 4-methyl-2-pentanone is stirred and refluxed for 50 hours. The cooled reaction mixture is filtered and the solvent is evaporated from the filtrate. The residue is dissolved in 400 parts of diisopropyl ether. Introduction of hydrogen chloride gas into the ether solution precipitates the hydrochloride, which is filtered off and recrystallized from ethyl acetate. This gives 1-(γ-phenoxypropyl)-4-ethoxy-4-phenylpiperidine hydrochloride melting at about 173–174.5° C.

*Example 11*

A mixture of 6.6 parts of 1-chloro-3-phenoxypropane, 7.66 parts of 4-propoxy-4-phenylpiperidine which has been isolated from its hydrochloride, 10.6 parts of sodium carbonate and 0.1 part of potassium iodide in 280 parts of 4-methyl-2-pentanone is stirred and refluxed for 50 hours. The reaction mixture is filtered and the solvent is evaporated from the filtrate. Hydrogen chloride gas is passed through a solution of the residue in ether. On standing 1-(γ-phenoxypropyl)-4-propoxy-4-phenylpiperidine hydrochloride precipitates from the ether solution. This product melts at about 168.5–169.5° C.

*Example 12*

From 11.5 parts of 4-methoxy-4-phenylpiperidine hydrochloride the free base is liberated by the procedure described in Example 9. The crude base is mixed with 4.6 parts of 1-chloro-4-phenoxybutane, 0.1 part of potassium iodide and 120 parts of anhydrous toluene and the mixture is placed in a sealed tube and heated for 92 hours at 150° C. The cooled reaction mixture is washed with water and the solvent is evaporated from the organic layer. The residue is treated with 82 parts of petroleum ether and 50 parts of dilute hydrochloric acid (1:1 by volume) is added. The solid which precipitates is filtered off and recrystallized from water to give 1-(δ-phenoxybutyl)-4-methoxy-4-phenylpiperidine hydrochloride melting at about 196–197° C. The free base of this compound has the formula

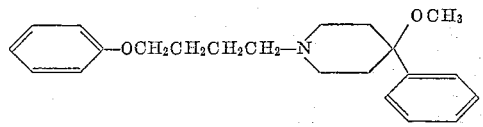

*Example 13*

A mixture of 3.7 parts of 1-chloro-4-phenoxybutane, 3.6 parts of 4-ethoxy-4-phenylpiperidine which has been isolated from its hydrochloride, 5.3 parts of sodium carbonate, and 0.1 part of potassium iodide in 280 parts of 4-methyl-2-pentanone is stirred and refluxed for 50 hours. The cooled reaction mixture is filtered and the solvent is evaporated from the filtrate. The residue is treated with a mixture of 400 parts of diisopropyl ether and 40 parts of 2-propanol. The precipitate which forms is filtered off and hydrogen chloride gas is introduced into the filtrate. The solvent is evaporated from the filtrate and the residue is recrystallized first from 2-propanol and then from ethyl acetate to give 1-(δ-phenoxybutyl)-4-ethoxy-4-phenylpiperidine hydrochloride melting at about 136–138.8° C.

*Example 14*

A mixture of 7.1 parts of 1-chloro-4-phenoxybutane, 7.66 parts of 4-propoxy-4-phenylpiperidine which has been isolated from its hydrochloride, 10.6 parts of sodium carbonate, and 0.1 part of potassium iodide in 280 parts of 4-methyl-2-pentanone is stirred and refluxed for 50 hours. The hot reaction mixture is filtered and the solvent is evaporated from the filtrate. To a solution of the residue in 2-propanol is added a solution of 3.5 parts of oxalic acid dihydrate in 320 parts of 2-propanol. On standing at room temperature there precipitates 1-(δ-phenoxybutyl)-4-propoxy-4-phenylpiperidine oxalate melting at about 191.8–192.6° C.

What is claimed is:

1. A compound of the formula

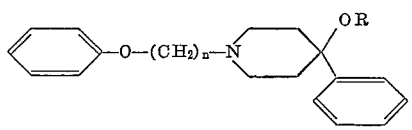

wherein $n$ is an integer greater than 1 and less than 5 and R is a lower alkyl group consisting of less than four carbon atoms.

2. A compound of the formula

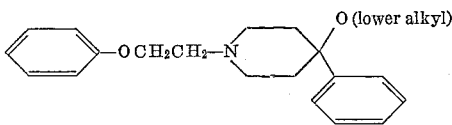

3. 1-(β-phenoxyethyl)-4-ethoxy-4-phenylpiperidine.
4. A compound of the formula

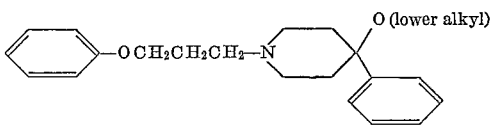

5. 1-(γ-phenoxypropyl)-4-ethoxy-4-phenylpiperidine.
6. A compound of the formula

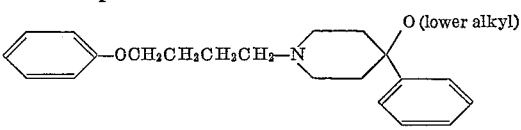

7. 1-(δ-phenoxybutyl)-4-methoxy-4-phenylpiperidine.

References Cited in the file of this patent
UNITED STATES PATENTS 2,960,507    Stern et al. _____ Nov. 15, 1960

FOREIGN PATENTS 872,045    Germany _____ Mar. 30, 1953